United States Patent [19]

Case et al.

[11] Patent Number: 5,390,115
[45] Date of Patent: Feb. 14, 1995

[54] COMPENSATED GAMMA-GAMMA DENSITY SONDE USING THREE DETECTORS

[75] Inventors: Charles R. Case, West Redding; Darwin V. Ellis, Ridgefield, both of Conn.

[73] Assignee: Schlumberger Technology Corporation, New York, N.Y.

[21] Appl. No.: 59,689

[22] Filed: May 10, 1993

[51] Int. Cl.$^6$ ............................................. G06F 15/20
[52] U.S. Cl. ................................. 364/422; 250/266; 250/269.3; 73/151; 73/153
[58] Field of Search ................ 364/420, 422; 250/265, 250/266, 267, 268, 269, 270; 73/151, 153

[56] References Cited

U.S. PATENT DOCUMENTS

| | | | |
|---|---|---|---|
| 3,321,625 | 5/1967 | Wahl | 250/71.5 |
| 3,864,569 | 2/1975 | Tittman | 250/264 |
| 4,034,218 | 7/1977 | Turcotte | 250/269 |
| 4,048,495 | 9/1977 | Ellis | 250/264 |
| 4,297,575 | 10/1981 | Smith, Jr. et al. | |
| 4,503,328 | 3/1985 | Neufeld | 250/269 |
| 4,529,877 | 7/1985 | Arnold | 250/266 |
| 4,570,067 | 2/1986 | Gadeken | 250/266 |
| 4,618,765 | 10/1986 | Sonne | 250/269 |
| 4,638,158 | 1/1987 | Sonne et al. | 250/266 |
| 4,661,700 | 4/1987 | Holenka | 250/267 |
| 4,698,501 | 10/1987 | Paske | 250/265 |
| 4,972,082 | 11/1990 | Loomis et al. | 250/269 |
| 5,012,091 | 4/1991 | Moake | 250/266 |

OTHER PUBLICATIONS

Ellis, D. V., *Well Logging for Earth Scientists*, Elsevier Science Publishing Co., Inc. New York, 1987, Chapter 10, pp. 201–225.

Primary Examiner—Gail O. Hayes
Assistant Examiner—Jennifer L. Hazard
Attorney, Agent, or Firm—Richard G. Berkley; Leonard W. Pojunas

[57] ABSTRACT

A gamma-gamma sonde for use in determining the bulk density of an earth formation adjacent a borehole comprises a source of gamma radiation and three attenuation-type gamma ray detectors DN, DI and DF spaced apart from the source, respectively, at successively greater distances. The count rate of each detector is converted into an apparent formation density $\rho$ based on data derived from calibration of the sonde in calibration media having known uniform density, thereby to obtain apparent formation densities $\rho_F$, $\rho_I$ and $\rho_N$. The ratio $$(\rho_F - \rho_I) \text{ to } (\rho_F - \rho_N)$$

is substantially independent of mudcake density and provides an estimate of the mudcake thickness. The calibration data involving mudcakes of known density and thickness enable the use of the mudcake thickness estimate to determine the value of k in the algorithm $$\rho_{apparent} = \rho_F + k(\rho_F - \rho_N),$$

from which formation density is determined.

8 Claims, 5 Drawing Sheets

\* K IN $\rho_{APPARENT} = \rho_F + K(\rho_F - \rho_N)$
\*\* MUDCAKE THICKNESS

COMPENSATED GAMMA-GAMMA DENSITY SONDE USING THREE DETECTORS

BACKGROUND OF THE INVENTION

It has long been recognized that the accuracy of measurements of the bulk densities of earth formations adjacent a borehole by gamma-gamma logging is greatly affected by variations in the thickness of the mudcake formed on the wall of the borehole. Compensation for variations in mudcake thickness conventionally is obtained by using a sonde having two detectors located at different distances from the source and processing the count rate data from the two detectors by comparing them with data based on calibration of the sonde in natural or simulated formations of known densities with mudcakes of varying thicknesses and compositions.

The determination of corrected formation densities from count rate data from the sonde is based on a "spine and ribs" analysis of calibration data. FIG. 2 of the accompanying drawings shows a spine and ribs representation of calibration data from a generic two-detector sonde having a far-spaced detector and a near-spaced detector located 7 in. and 14 in. from the source, for example. Other locations are possible. The "spine" is formed by connecting the data points of the count rates of the detectors at different known formation densities with no mudcake. Each "rib" is obtained by connecting the near and far count rate data points for a single formation density and various thicknesses of a mudcake of the same density (1.2 g/cc. in the example of FIG. 2). Each data point is obtained with a uniform standoff between the sonde and the formation (uniform thickness mudcake).

The spine and ribs data can be converted into apparent density data that are functions of the count rates of the detectors and density correction data that are functions of the differences between the apparent densities determined from the count rates of the far and near detectors. The apparent density data and correction data are stored in a computer. In a logging run, the count rate data from the sonde are input to the computer and compared with the stored data to obtain a correction for mudcake density, which is added to the apparent density determined from the count rate of the far detector to obtain formation density. Reference may be made to Ellis, D. V., *Well Logging for Earth Scientists*, Elsevier Science Publishing Co., Inc., New York, 1987, for a detailed discussion of gamma-gamma density logging using two detector sondes.

For thin mudcakes, say up to 0.5 in., the spine and ribs correction for mudcake thickness is relatively insensitive to mudcake density. For thicker mudcakes, mudcake density introduces significant errors into the corrections. In the spine and ribs representation of FIG. 3, families of ribs for two formation densities and different mudcake thicknesses and densities are plotted. It is clear from FIG. 3 that different corrections to apparent densities computed from the far detector count rates are required for different mudcake densities. The problem is that the data from two detectors do not provide any way of taking into account differences in mudcake density in correcting the apparent density determined from the far detector count rate.

SUMMARY OF THE INVENTION

One object of the present invention is to provide a method and apparatus for use in determining the bulk density of an earth formation adjacent a wellbore that provides improved accuracy, particularly in that the apparent formation density data are corrected for variations in the thickness of the mudcake to yield the formation density result. Another object is to simplify both the calibration data and the data-processing required to correct the measured formation density data derived from the count rates of the sonde detectors for mudcake effects.

The count rate data plotted in FIG. 3 can be interpreted differently, namely by plotting ribs that follow mudcake thicknesses only without regard to density. Such a plot, FIG. 4, shows that the ribs following mudcake thicknesses only are essentially linear and those for the same mudcake thicknesses are substantially parallel, which indicates that a simpler correction, one based on constant rib angles for all mudcake densities of the same thickness, might be possible. The problem remains, then, to determine the correct mudcake thickness that will establish the correct rib angle to use for correcting gamma count rate data indicative of formation density. The present invention solves that problem and attains the objects referred to above.

According to one aspect of the present invention, there is provided a sonde for use in determining the bulk density of an earth formation adjacent a borehole comprising a sonde member engageable with a lengthwise portion of a wall of the borehole, a device for maintaining the sonde member in engagement with the borehole wall portion, a source of gamma radiation mounted on the member, and three attenuation-type detectors DN, DI and DF mounted on the member at locations spaced apart from the source, respectively, at successively greater distances along an axis aligned substantially with the sonde axis. The count rate of each detector DN, DI and DF is converted into an apparent formation density estimate $\rho_N$, $\rho_I$ and $\rho_F$, respectively, based on calibration of the sonde in uniform formation densities. Specifically, the sonde is placed in a calibration apparatus without any intervening mudcake between the sonde and the formation. The three detector count rates are recorded as a function of formation density, and experience has shown that the logarithm of the observed count rates is a linear function of formation density. A least squares fit between the logarithm of the count rates and formation density yields a pair of coefficients for each detector which can then be used to convert measured count rates into apparent formation densities. Estimates of apparent formation density when there is an intervening mudcake are made using the same sets of coefficients described above under no mudcake conditions. FIG. 5 shows apparent formation density estimates derived from the three individual detectors for the case of 2.4 g/cc uniform formation and a mudcake density of 1.4 g/cc as a function of mudcake thickness. It has been observed that the ratio $$(\rho_F - \rho_I) \text{ to } (\rho_F - \rho_N)$$

is substantially independent of mudcake density and is substantially solely a function of mudcake thickness.

According to another aspect of the invention, the bulk density of an earth formation adjacent a borehole is determined by a method comprising the steps of positioning a sonde in the borehole with a member thereof in engagement with a portion of the wall of the borehole, irradiating the formation with gamma rays from a gamma source on the sonde member, detecting gamma rays using three attenuation-type detectors DN, DI and DF located on the sonde member, respectively, at fixed successively greater distances from the gamma source and generating count rate signals indicative of the gamma rays detected by each of the detectors. The count rate signals are processed to derive the density of the formation by comparing them with data based on calibration of the sonde, the data including (1) estimates of the apparent densities $\rho_N$, $\rho_I$, and $\rho_F$ detected by each detector DN, DI and DF, respectively;

(2) an estimate of mudcake thickness $t_{mc}$ derived from the ratio of the differences between the estimated apparent densities detected by detector DN and the respective detectors DI and DF $[(\rho_F - \rho_I)$ to $(\rho_F - \rho_N)]$; and (3) the value k in the algorithm $$\rho_{apparent} = \rho_F + k(\rho_F - \rho_N)$$

which is determined from calibration data involving mudcakes of known density and thickness.

For a better understanding of the invention, reference may be made to the following description of an exemplary embodiment, taken in conjunction with the accompanying drawings.

to determine the apparent formation density; and

Figure 8:
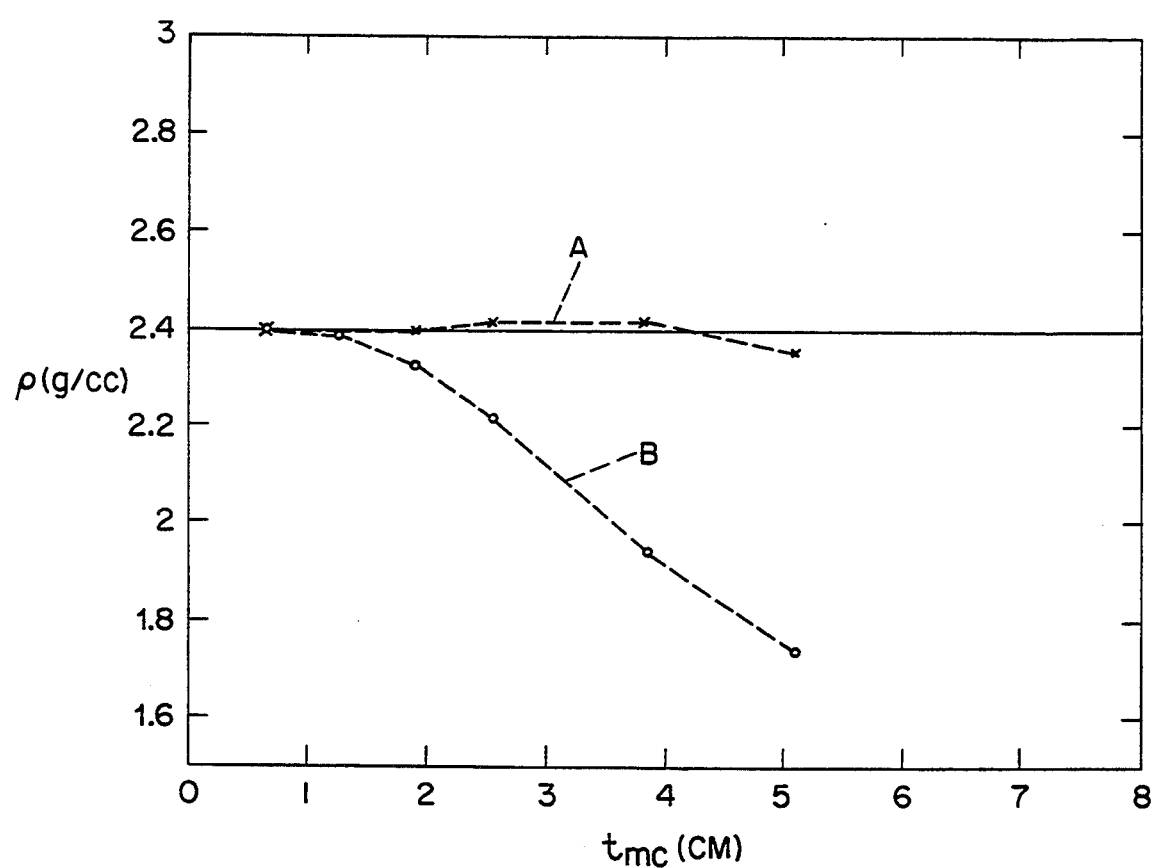

FIG. 8 is a plot comparing the results of determinations of apparent densities $\rho$ when the true formation density was 2.4 g/cc and various mudcake thicknesses (mudcake density was 1.4 g/cc) with a three detector sonde, curve A, according to the invention and with a two detector, curve B, prior art sonde.

DESCRIPTION OF AN EMBODIMENT

Figure 1:
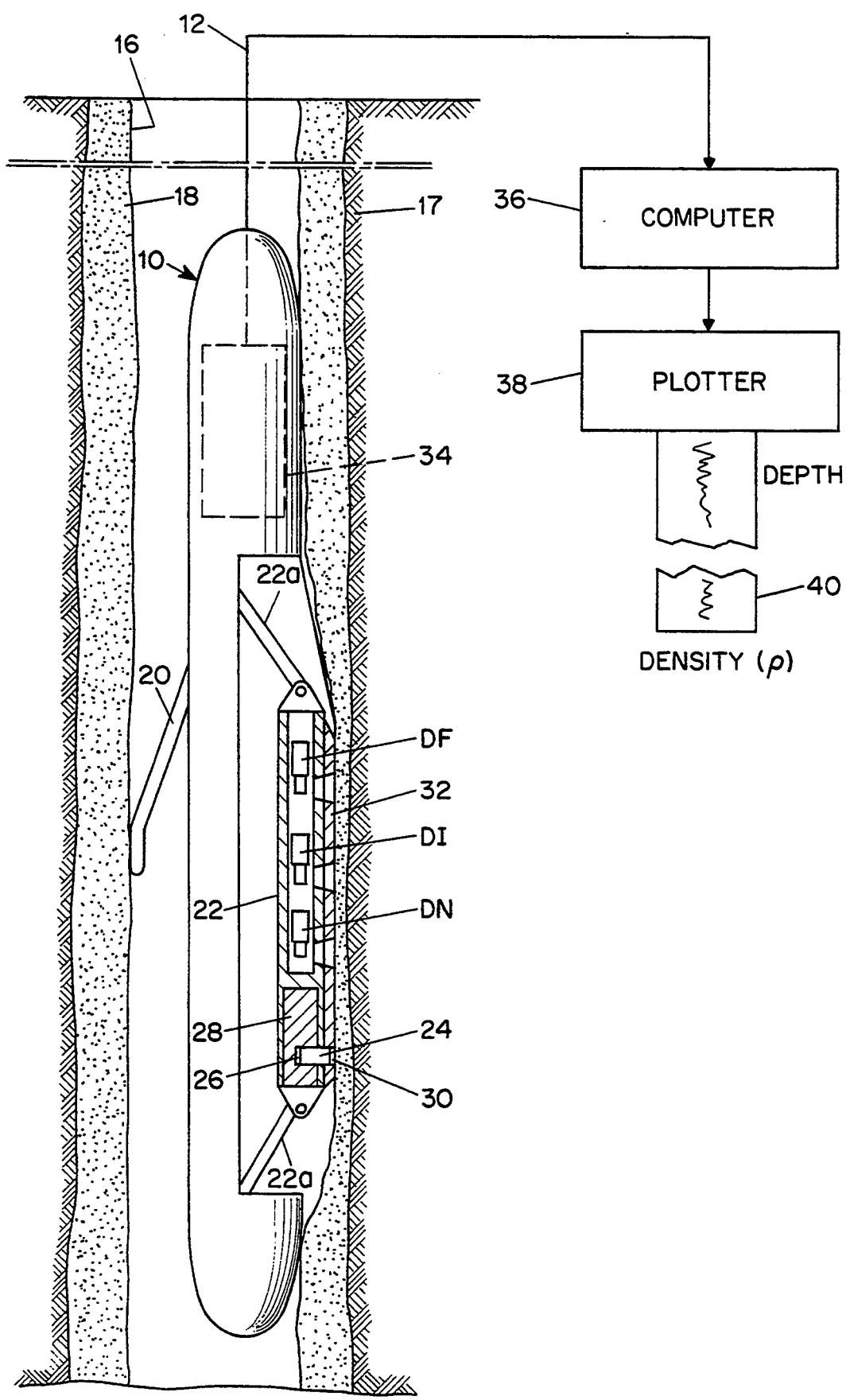
FIG. 1 is a schematic drawing of an embodiment of apparatus according to the present invention.
Figure 2:
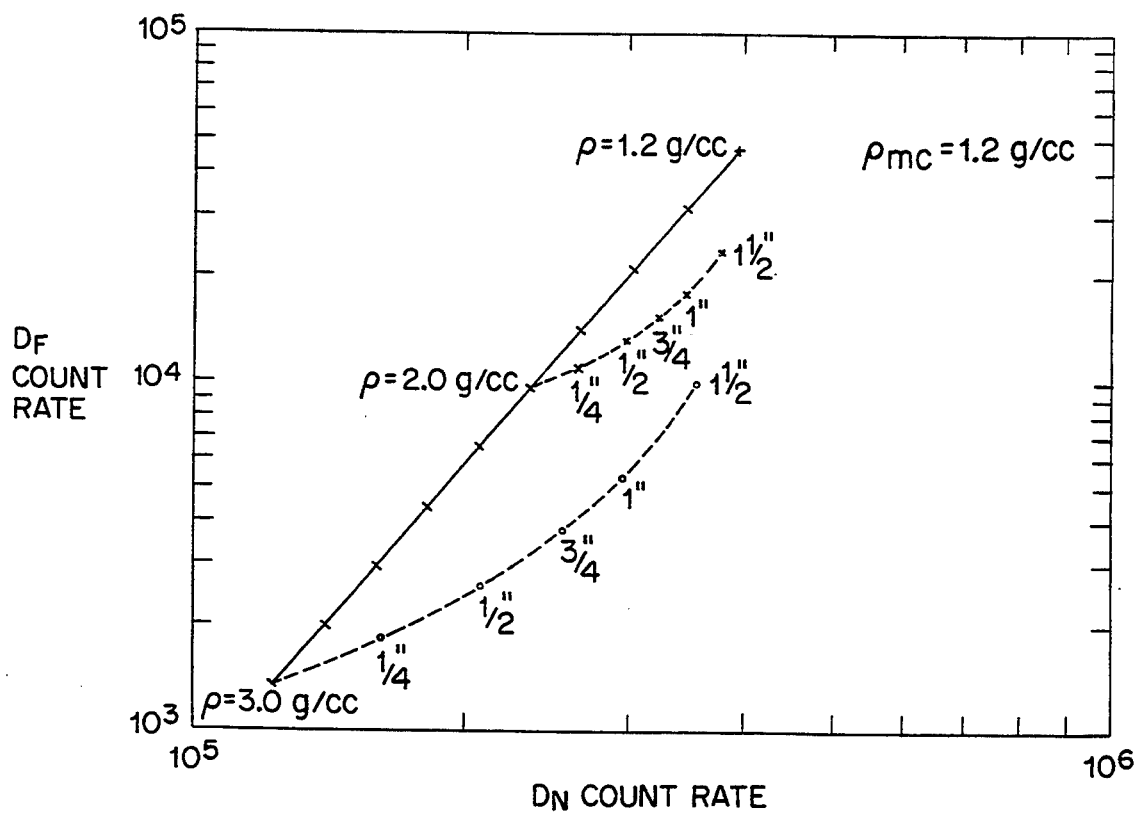
FIG. 2 is an exemplary "spine and ribs" plot of formation densities from gamma detector count rates with various mudcake thicknesses and one mudcake density.
Figure 3:
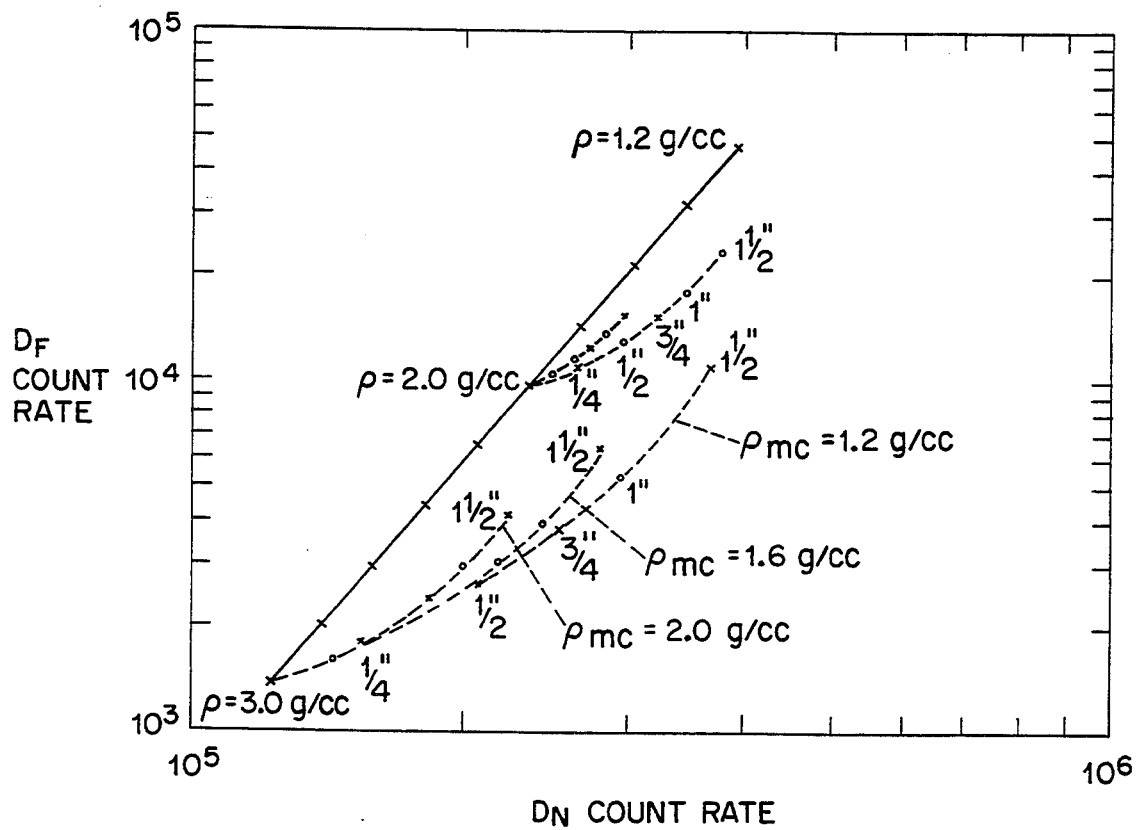
FIG. 3 is a "spine and ribs" plot of formation densities from gamma detector count rates with various thicknesses of mudcakes of different densities.

As shown in FIG. 1, a logging sonde 10 is suspended by a cable 12 in a borehole 16, which is surrounded by earth formations 17. The formation walls forming the borehole are coated with a mudcake 18. The sonde 10 is equipped with a suitable device, such as a resiliently biassed arm 20, that maintains one side of the sonde in contact with the borehole wall (i.e., the mudcake on the formation wall). That side of the sonde has a lengthwise pad member 22, which is urged against the portion of the borehole wall opposite from the arm 20 by resiliently actuated arms 22a so that the pad member follows as much as possible all irregularities in the borehole walls.

Located along the pad member 22 in substantial alignment with the lengthwise axis of the sonde and diametrically opposite from the arm 20 are a gamma ray source 24, a near-spaced gamma ray detector DN, an intermediate-spaced gamma ray detector DI, and a far-spaced gamma ray detector DF. The three gamma ray detectors are of the attenuation type, which in the art simply means that they are all located sufficiently far (more than the mean free path length of gamma rays from the source to the detector, which is generally about two inches) from the gamma ray source that the count rates decrease as the densities of the formation and mudcake materials adjacent to them increase. The detectors DN, DI, and DF are located, respectively, at successively greater distances from the source 24.

The source 24, which may be any suitable source of gamma rays such as Cesium 137, is received in a collimating cavity 26, which is surrounded by a high density shielding material 28, such as tungsten. The cavity 26 is closed by a window 30 of a material transparent to gamma rays, such as an epoxy resin.

Each of the gamma ray detectors DN, DI and DF consists of scintillator crystal, which may be NaI, optically coupled to a photomultiplier. The external wall of the pad member has a shield 32 of a high density material, such as tungsten, and the crystal of each detector is positioned in a non-collimating window in the shield 32 of a material, such as an epoxy resin, that is transparent to gamma rays.

An electronics unit 34 in the sonde 10 receives the output pulses from each of the three detectors, processes them, and transfers processed data through a conductor in the cable 12 to a computer 36 at the surface. The unit 34 counts the output pulses from each detector for a predetermined time period (e.g., 0.1 sec.) at appropriate time intervals, converts the total count between appropriate high limits for each detector to a count rate, and digitizes each count rate. The count rate data transmitted from the sonde electronics unit 34 are processed in the computer 36, which provides output to a plotter 38 that produces a log 40 of formation density as a function of borehole depth. The count rate data can, of course, also be stored in a computer memory device for separate or additional processing at a location remote from the borehole site.

The processing in the computer 36 of the count rate data from the sonde 10 is based on data derived from calibration of the sonde in calibration apparatus that simulates formations of known uniform densities and mudcakes of known uniform densities and thicknesses. The first step in the calibration process is to convert the count rate of each detector into an apparent formation density. The count rates of each detector in materials of known uniform densities are determined. The relationship between the count rates for each detector in formations of different, known densities permits apparent formation densities as functions of different mudcake thicknesses to be estimated.

Figure 5:
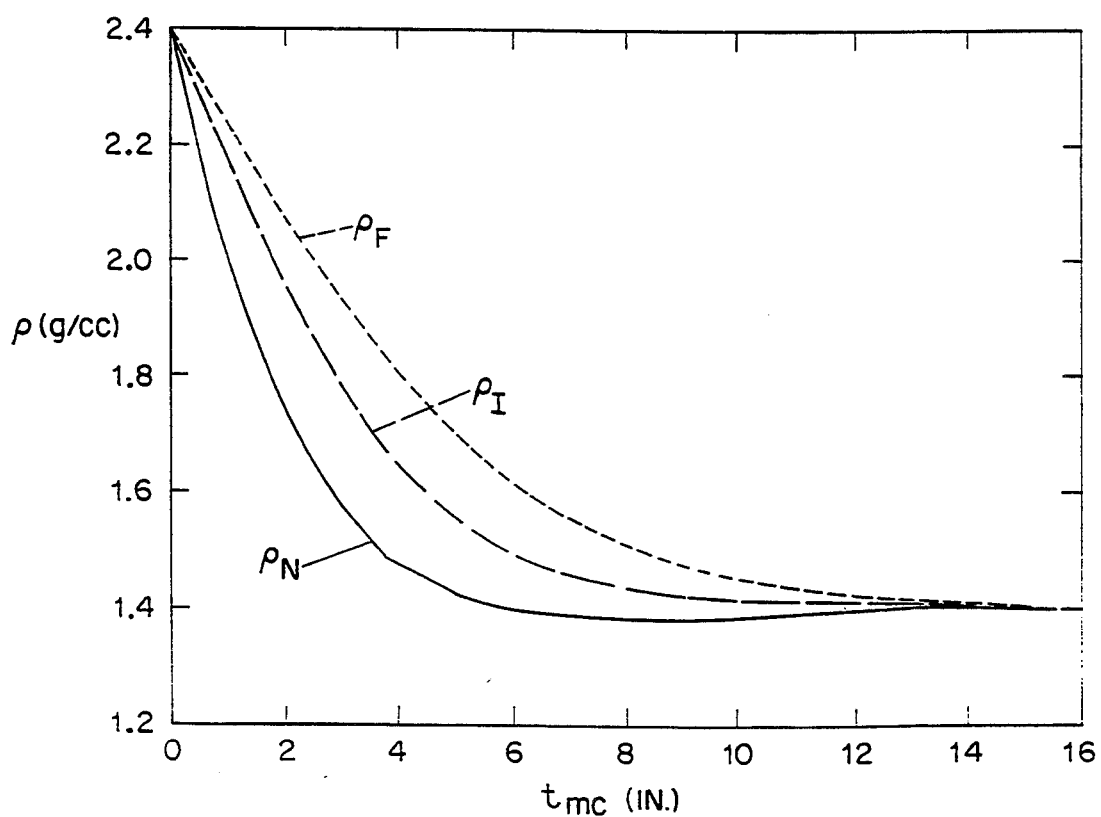
FIG. 5 is a plot of the estimated apparent densities $\rho$ determined for each of three attenuation-type gamma detectors located at different distances from a gamma source as functions of mudcake thicknesses.

The estimated apparent densities $\rho_N$, $\rho_I$, and $\rho_F$ as functions of mudcake thickness for a sonde conforming to FIG. 1 having detector spacings from the center of the source window to the leading edges of the respective detector windows of DN=7 in., DI=10 in. and DF=14 in. are shown in FIG. 5. These spacings were chosen for purposes of illustration. Other spacings are possible. The plot in FIG. 5 is derived from the calibration of the sonde in uniform formation densities.

Figure 4:
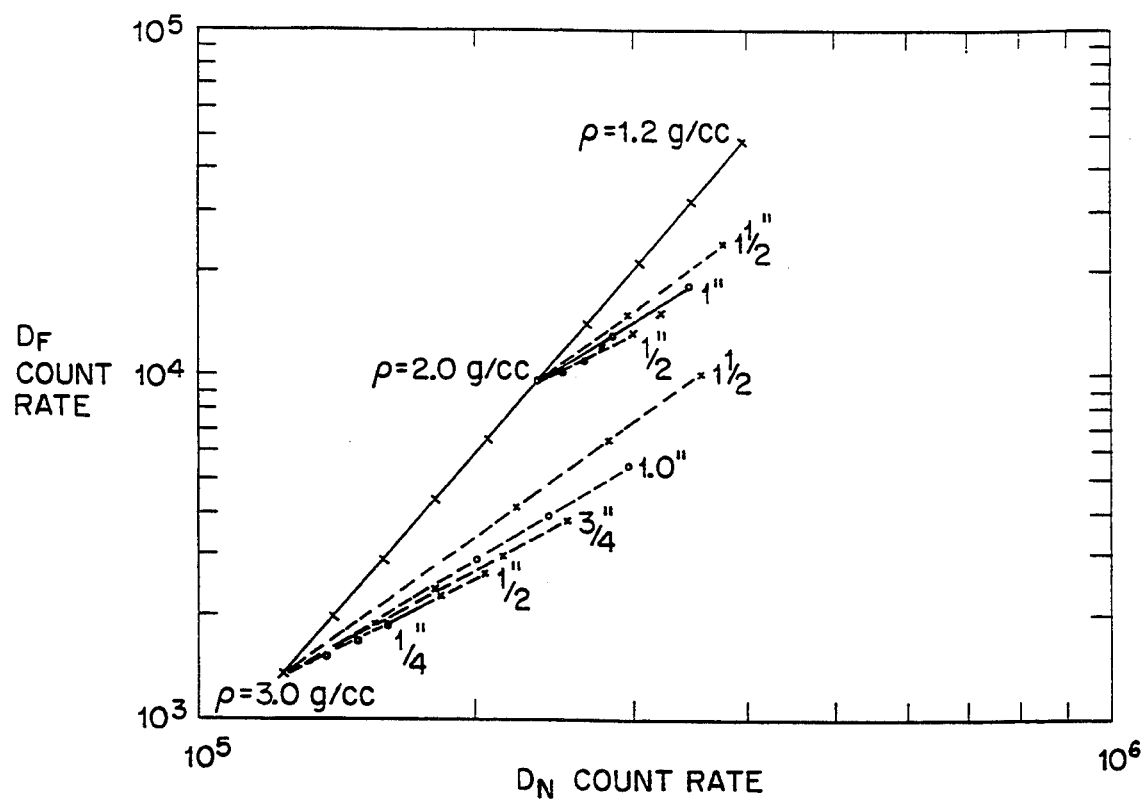
FIG. 4 is a "spine and ribs" plot from the count rate data of FIG. 3, reinterpreted to show the ribs as a function of mudcake thickness only.
Figure 6:
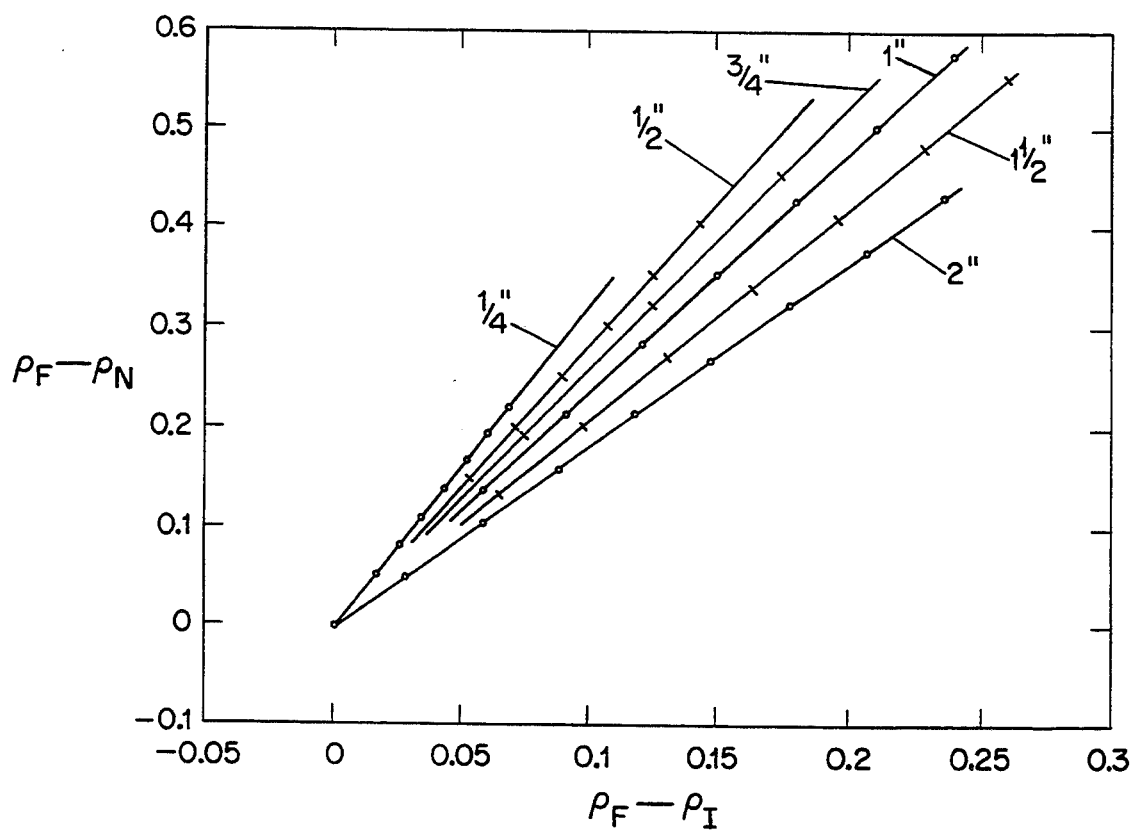
FIG. 6 is a cross plot from the data of FIG. 5 of mudcake thicknesses as functions of $(\rho_F - \rho_I)$ and $(\rho_F - \rho_N)$.
Figure 7:
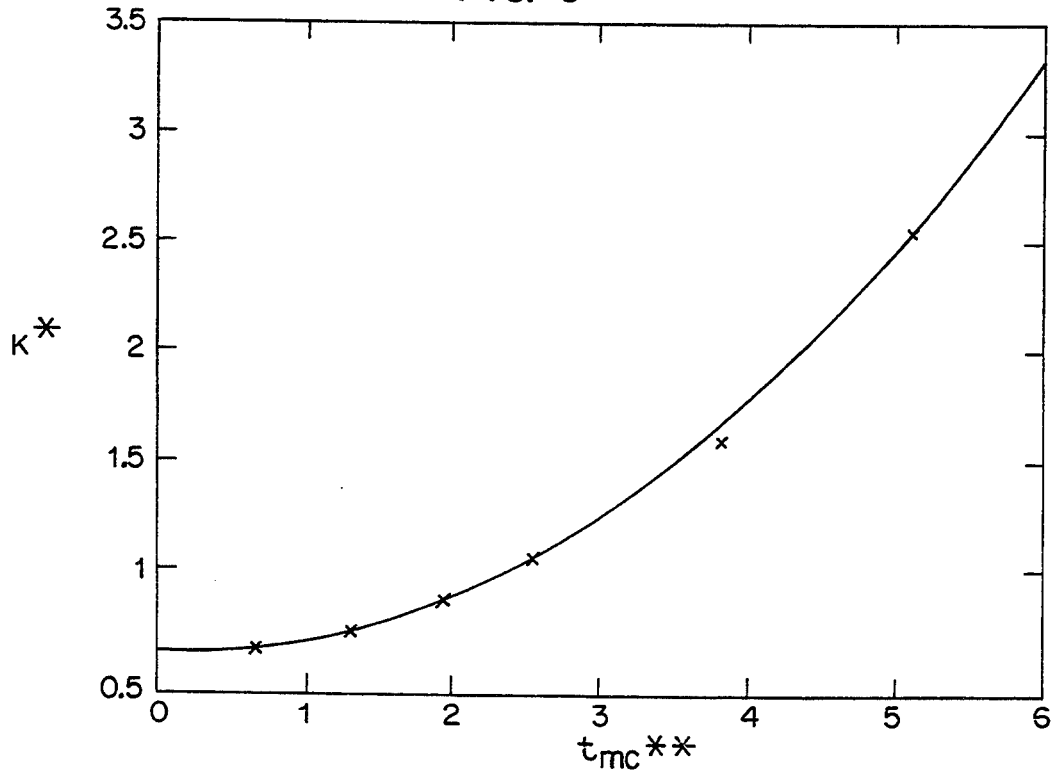
FIG. 7 is a plot of k, i.e., the slope of the lines in FIG. 6, which is used in the algorithm, $$\rho_{apparent} = \rho_F + k(\rho_F - \rho_N)$$

It has been found that the ratio of $(\rho_F - \rho_I)$ to $(\rho_F - \rho_N)$, in which $\rho_N$, $\rho_I$, and $\rho_F$ are the estimated apparent densities determined from the count rates of the respective detectors DN, DI and DF, is substantially independent of mudcake density and is essentially solely a function of mudcake thickness. Accordingly, a cross-plot, as shown in FIG. 6, permits mudcake thickness to be estimated from the ratio $(\rho_F - \rho_I)$ to $(\rho_F - \rho_N)$. The estimate of mudcake thickness, in turn, permits a spine and ribs analysis of the type represented by FIG. 4 to be used to determine formation density. The estimate of mudcake thickness establishes the appropriate rib along which correction of a data point of the count rates of the near and far detectors is to be made. The correction algorithm for the spine and ribs plot of FIG. 4 is $$\rho_{apparent} = \rho_F + k(\rho_F - \rho_N)$$

in which k is the slope of the rib and is therefore a function of mudcake thickness. The values of k derived from the data used to construct FIG. 4 are shown in FIG. 7.

The following data for the sonde are input to the computer:
(1) the estimated apparent densities $\rho_N$, $\rho_I$, and $\rho_F$;
(2) the ratio $$(\rho_F - \rho_I) \text{ to } (\rho_F - \rho_N)$$

to estimate mudcake thickness $t_{mc}$ (see FIG. 6); and
(3) the value of k (FIG. 7) determined by the mudcake thickness estimate to be used in the expression $$\rho_{apparent} = \rho_F + k(\rho_F - \rho_N)$$

to determine apparent formation density.

The stored calibration data are compared with count rate data transmitted from the sonde. The count rate for each detector is converted into an apparent density from (1) above, yielding $\rho_N$, $\rho_I$, and $\rho_F$. The estimated mudcake thickness is determined from (2) above and is used in (3) above to determine the value of k. The algorithm $$\rho_{apparent} = \rho_F + k(\rho_F - \rho_N)$$

yields the density of the formation, which is plotted on the log as a function of wellbore depth.

FIG. 8 illustrates by curve A the performance of the three-detector sonde of FIG. 1 and the processing algorithm of the present invention and by curve B the performance of a conventional two detector-sonde and the corresponding spine and ribs analysis of the count data in test apparatus having a known formation density of 2.4 g/cc., a known mudcake density of 1.4 g/cc and various known mudcake thicknesses. (The two detector sonde used to obtain the densities recorded in FIG. 8 had a collimated near-spaced detector located 7 in. from the source and a non-collimated detector located 14 in. from the source.) The density results obtained with the three-detector sonde and processing of the invention are considerably more accurate than those obtained with the two-detector sonde and prior art processing for mudcake thicknesses above about 0.5 in. The calibration data used in the invention are simpler and are processed more quickly and easily.

We claim:

1. A sonde for use in determining the bulk density of an earth formation adjacent to a borehole comprising a member engageable with a lengthwise portion of a wall of the borehole, means for maintaining the member in engagement with the borehole wall portion, a source of gamma radiation mounted on the member, and three attenuation-type detectors DN, DI and DF mounted on the member at locations spaced apart from the source, respectively, at successively greater distances, the spacings of the detectors from the source being such that when the count rate of each detector DF, DI and DN is converted into an estimated apparent formation density $\rho_F$, $\rho_I$ and $\rho_N$, respectively, based on calibration of the sonde in a calibration media consisting of formations having known uniform densities, the ratio $$(\rho_F - \rho_I) \text{ to } (\rho_F - \rho_N)$$

is substantially independent of mudcake density and is substantially solely a function of mudcake thickness.

2. A method for determining the bulk density of an earth formation adjacent to a borehole comprising the steps of positioning a member in engagement with a lengthwise portion of the wall of the borehole, irradiating the formation with gamma rays from a gamma source on the member, detecting gamma ray radiation using three attenuation-type detectors DN, DI and DF located on the member, respectively, at fixed successively greater distances from the gamma source and generating count rate signals indicative of the gamma ray radiation detected by each of the detectors, and processing the count rate signals to derive the density of the formation by comparing them with data based on calibration of the sonde, the data including
  (1) estimates of the apparent densities $\rho_N$, $\rho_I$, and $\rho_F$ detected by each detector DN, DI and DF, respectively, of media of known uniform densities,
  (2) an estimate of mudcake thickness $t_{mc}$ from the ratio of the differences between the estimated apparent densities detected by detector DN and the respective detectors DI and DF $(\rho_F - \rho_I)$ to $(\rho_F - \rho_N)$, and
  (3) the value of k determined by the mudcake thickness estimate to be used in the expression $$\rho_{apparent} = \rho_F + k(\rho_F - \rho_N)$$

to determine apparent formation density.

3. Apparatus for determining the bulk density of an earth formation adjacent to a mudcake-lined borehole, comprising:
  a sonde adapted for movement through the borehole and including a member for engagement with a lengthwise portion of the borehole wall;
  means for maintaining the member in engagement with the borehole wall;
  a source of gamma radiation mounted on the member;
  three attenuation-type gamma ray detectors DN, DI and DF mounted on the member at locations spaced apart from the source, respectively, at successively greater distances lengthwise of the member;

means coupled to each detector for generating a count rate signal representative of the intensity of gamma ray radiation detected by that detector; and means for processing the three detector count rate signals in accordance with a predetermined relationship, relating the respective detector count rate signals in calibration apparatus having formation materials of known bulk density and mudcakes of known thickness and bulk density to apparent values of formation bulk density, to derive a measurement of the bulk density of the formation corrected for mudcake thickness, the signal processing means including means for processing the three detector count rate signals to derive respective values of the apparent formation bulk density $\rho_N$, $\rho_I$, and $\rho_F$;

means for processing signals representative of the respective apparent bulk density values $\rho_N$, $\rho_I$, and $\rho_F$ to derive a measurement of mudcake thickness $t_{mc}$; and means for processing signals representative of the mudcake thickness value $t_{mc}$, the near-detector apparent bulk density value $\rho_N$, and the far-detector apparent bulk density value $\rho_F$ to derive the mudcake-corrected value of the formation bulk density.

4. The apparatus of claim 3, wherein the processing means for deriving a measurement of the mudcake thickness $t_{mc}$ combines the signals representative of the respective apparent bulk density values $\rho_N$, $\rho_I$ and $\rho_F$ in accordance with the ratio relationship $$(\rho_F - \rho_I) : (\rho_F - \rho_N).$$

5. The apparatus of claim 4, wherein the means for processing signals representative of the mudcake thickness $t_{mc}$, the near-detector apparent bulk density $\rho_N$ and the far-detector apparent bulk density $\rho_F$ combines the signals in accordance with the relationship $$\rho_{APPARENT} = \rho_F + k(\rho_F - \rho_N),$$

where k is a predetermined constant derived in said calibration apparatus.

6. A method for determining the bulk density of an earth formation adjacent to a mudcake-lined borehole, comprising the steps of:

positioning a sonde in a borehole with a member thereof in engagement with a lengthwise portion of the borehole wall;

irradiating the formation with gamma rays from a gamma ray source on the member;

detecting gamma rays using three attenuation-type gamma ray detectors DN, DI and DF located on the member at fixed, successively greater distances, respectively, from the source;

generating a count rate signal representative of the intensity of the gamma ray radiation detected by each detector; and processing the three detector count rate signals in accordance with a predetermined relationship, relating the respective detector count rate signals in calibration apparatus having formation materials of known bulk density and mudcakes of known thickness and bulk density to apparent values of formation bulk density, to derive a measurement of the bulk density of the formation corrected for mudcake thickness, the processing step including processing the three detector count rate signals to derive respective values of the apparent formation bulk density $\rho_N$, $\rho_I$, and $\rho_F$ as a function of mudcake thickness $t_{mc}$;

combining signals representative of the respective apparent bulk density values $\rho_N$, $\rho_I$, and $\rho_F$ to derive a measurement of mudcake thickness $t_{mc}$; and combining signals representative of the mudcake thickness value $t_{mc}$, the near-detector apparent bulk density value $\rho_N$, and the far-detector apparent bulk density value $\rho_F$ to derive the mudcake-corrected value of the formation bulk density.

7. The method of claim 6, wherein the step of deriving a measurement of the mudcake thickness $t_{mc}$ comprises combining the signals representative of the respective apparent bulk density values $\rho_N$, $\rho_I$ and $\rho_F$ in accordance with the ratio relationship $$(\rho_F - \rho_I):(\rho_F - \rho_N).$$

8. The method of claim 7, wherein the step of combining signals representative of the mudcake thickness $t_{mc}$, the near-detector apparent bulk density $\rho_N$ and the far-detector apparent bulk density $\rho_F$ comprises combining the signals in accordance with the relationship $$\rho_{APPARENT} = \rho_F + k(\rho_F - \rho_N),$$

where k is a predetermined constant derived in said calibration apparatus.

* * * * *